United States Patent
Kawabata (10) Patent No.: US 10,742,829 B2
(45) Date of Patent: Aug. 11, 2020

(54) IMAGE READING APPARATUS (71) Applicant: SEIKO EPSON CORPORATION, Tokyo (JP)

(72) Inventor: Seiji Kawabata, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 16/702,745

(22) Filed: Dec. 4, 2019

(65) Prior Publication Data
US 2020/0186662 A1 Jun. 11, 2020

(30) Foreign Application Priority Data
Dec. 7, 2018 (JP) .................. 2018-230128

(51) Int. Cl.
H04N 1/00 (2006.01)
H04N 1/12 (2006.01)

(52) U.S. Cl.
CPC ..... H04N 1/00806 (2013.01); H04N 1/00607 (2013.01); H04N 1/125 (2013.01)

(58) Field of Classification Search
CPC ............ B65H 2220/01; B65H 2511/20; B65H 2511/214; B65H 2220/08; B65H 2220/11; B65H 2511/51; B65H 2511/515; B65H 1/04; B65H 1/26; B65H 2403/513; B65H 2404/1531; B65H 2405/114; B65H 2405/332; B65H 2801/12; B65H 2801/39; B65H 3/0669; B65H 3/0684; B65H 3/44; B65H 7/18; B65H 16/00; B65H 19/105; B65H 2301/41374; B65H 2511/512; B65H 31/3081; B41C 1/144; B41J 11/0095; B41J 13/0009; B41J 13/103; B41J 29/02; B41J 29/13; G03G 15/0131; G03G 15/0173; G03G 15/161; G03G 15/6573; G03G 15/0872; G03G 15/0877; G03G 15/0879;
(Continued)

(56) References Cited

U.S. PATENT DOCUMENTS 5,021,837 A * 6/1991 Uto ................ B42B 4/00
227/99
5,288,062 A * 2/1994 Rizzolo .......... B65H 31/3027
270/58.12
(Continued)

FOREIGN PATENT DOCUMENTS

JP 2012151570 8/2012
JP 2018164204 10/2018

Primary Examiner — Negussie Worku
(74) Attorney, Agent, or Firm — Workman Nydegger (57) ABSTRACT A scanner unit includes a first reading section that reads a medium via a transparent member; and a bracing member that pushes the medium toward the transparent member by a coil spring. The bracing member includes a contact portion coming into contact with the transparent member in a downstream of a first reading region, and a gap forming surface that is positioned in a direction further away from the transparent member than the contact portion, which includes the first reading region, in an upstream of the contact portion, and is formed with a gap in which the medium is configured to be transported between the pushing member and the transparent member. A pressing position of the pushing member by the coil spring is shifted from a position of the contact portion in a medium transporting direction.

11 Claims, 10 Drawing Sheets (58) Field of Classification Search
CPC .......... G03G 15/0886; G03G 15/6541; G03G
2215/00827; G03G 2215/00911; G03G
2215/0692; B42C 1/12; H04N 1/03;
H04N 1/1215; H04N 1/125; H04N 1/193
USPC ........................................................ 358/498
See application file for complete search history.

(56) References Cited

U.S. PATENT DOCUMENTS

| | | | | |
|---|---|---|---|---|
| 5,478,062 | A * | 12/1995 | Horiuchi | B42C 1/12 |
| | | | | 270/58.08 |
| 2003/0179272 | A1* | 9/2003 | Saito | B41J 11/0005 |
| | | | | 347/104 |
| 2009/0284808 | A1* | 11/2009 | Hamada | H04N 1/2032 |
| | | | | 358/474 |
| 2011/0156344 | A1* | 6/2011 | Chen | B65H 3/5215 |
| | | | | 271/225 |

* cited by examiner

IMAGE READING APPARATUS

The present application is based on, and claims priority from JP Application Serial Number 2018-230128, filed Dec. 7, 2018, the disclosure of which is hereby incorporated by reference herein in its entirety.

BACKGROUND

1. Technical Field

The present disclosure relates to an image reading apparatus that reads a medium.

2. Related Art

In a scanner which is an example of an image reading apparatus, an automatic feeder sends a medium from a medium tray to a transport path, a reading section provided in a middle of the transport path reads the medium, the medium after being read by the reading section is discharged to a discharge tray, and feeding and reading of a plurality of media are automatically performed. An automatic medium feeder is also called an auto document feeder and may be abbreviated as ADF.

In JP-A-2012-151570, an example of such an image reading apparatus is described.

A reading section reads an image of a medium transported on a transparent member such as glass. In order to obtain good reading accuracy when the reading section reads the medium, it is desirable that the medium is in close contact with the transparent member. Therefore, in the transport path of the image reading apparatus described in JP-A-2012-151570, a pushing frame 49, as a pushing member that pushes the medium toward the transparent member, is provided at a position facing the reading section. The pushing frame 49 is pressed toward the transparent member by a spring 50 as a pressing member.

As in the configuration described in JP-A-2012-151570, if the pressing member presses the pushing member from above a contact position between the pushing member and the transparent member, a transport resistance, when the medium is transported between the pushing member and the transparent member, becomes high, and the transport becomes poor, for example, if the document is thin paper. Therefore, there is a concern that a reading accuracy of the image is lowered.

SUMMARY

According to an aspect of the present disclosure, there is provided an image reading apparatus including: a transport path that forms a path for transporting a medium between a first path surface and a second path surface facing the first path surface; a transparent member forming a part of the first path surface; a reading section that reads the medium transported along the transport path via the transparent member; a pushing member that pushes the medium, from a second path surface side toward the transparent member, transported along the transport path; and a pressing member that presses the pushing member from the second path surface side toward the transparent member. The pushing member includes a contact portion that comes into contact with the transparent member in a downstream of a reading region by the reading section in a medium transporting direction, and a gap forming surface that is positioned in a direction further away from the transparent member than the contact portion in an upstream of the contact portion which includes the reading region in the medium transporting direction, and is formed with a gap in which the medium is configured to be transported between the pushing member and the transparent member. A pressing position of the pushing member by the pressing member is shifted from a position of the contact portion in the medium transporting direction.

DESCRIPTION OF EXEMPLARY EMBODIMENTS

Hereinafter, the present disclosure will be schematically described.

An image reading apparatus according to a first aspect includes: a transport path that forms a path for transporting a medium between a first path surface and a second path surface facing the first path surface; a transparent member forming a part of the first path surface; a reading section that reads the medium transported along the transport path via the transparent member; a pushing member that pushes the medium, from a second path surface side toward the transparent member, transported along the transport path; and a pressing member that presses the pushing member from the second path surface side toward the transparent member. The pushing member includes a contact portion that comes into contact with the transparent member in a downstream of a reading region by the reading section in a medium transporting direction, and a gap forming surface that is positioned in a direction further away from the transparent member than the contact portion in an upstream of the contact portion which includes the reading region in the medium transporting direction, and is formed with a gap in which the medium is capable of being transported between the pushing member and the transparent member. A pressing position of the pushing member by the pressing member is shifted from a position of the contact portion in the medium transporting direction.

According to the aspect, the pushing member includes the contact portion that comes into contact with the transparent member in the downstream of the reading region by the reading section in the medium transporting direction, and the gap forming surface that is positioned in the direction further away from the transparent member than the contact portion in the upstream of the contact portion which includes the reading region in the medium transporting direction, and is formed with the gap in which the medium is capable of being transported between the pushing member and the transparent member. The pressing position of the pushing member by the pressing member is shifted from the position of the contact portion in the medium transporting direction. Therefore, for example, a transport resistance between the contact portion and the transparent member can be made smaller than that in a case in which the position of the contact portion is the pressing position. Therefore, a concern of poor transport of the medium passing between the pushing member and the transparent member can be reduced, and a decrease in a reading accuracy of the image can be avoided.

According to a second aspect, in the first aspect, the pressing position overlaps the gap forming surface in the medium transporting direction.

According to the aspect, since the pressing position of the pushing member by the pressing member overlaps the gap forming surface in the medium transporting direction, the pressing position and the position of the contact portion are reliably shifted to be disposed, and the effect of the first aspect can be reliably obtained.

According to a third aspect, in the second aspect, a pushing member is configured so that the contact portion is rotatable in a direction away from the transparent member against a pressing force of the pressing member, with the upstream of the pressing position in the medium transporting direction as a rotation fulcrum.

According to the aspect, the pushing member is configured to have a rotation shaft in the upstream of the pressing position in the medium transporting direction so that the contact portion is rotatable in the direction away from the transparent member against the pressing force of the pressing member. Therefore, when the medium passes between the contact portion and the transparent member, the contact portion can easily escape in the direction away from the transparent member, and the transport resistance of the medium can be reduced.

According to a fourth aspect, in any one aspect of the first to third aspects, the pushing member includes foot portions that are provided on both sides of the gap forming surface in a width direction intersecting the medium transporting direction, and abut against the first path surface in an outside of a medium transport region in the width direction.

According to the aspect, the pushing member includes the foot portions that are provided on the both sides of the gap forming surface in the width direction intersecting the medium transporting direction, and abut against the first path surface in the outside of the medium transport region in the width direction. Therefore, the gap, through which the medium is capable of transporting can be reliably formed between the gap forming surface and the transparent member.

According to the fifth aspect, in the fourth aspect, the image reading apparatus further includes a sheet material in the transparent member in the upstream of the reading region.

According to the aspect, the sheet material can suppress that the medium comes into direct contact with a portion corresponding to the reading region of the transparent member.

According to a sixth aspect, in any one aspect of the first to fifth aspects, the pushing member includes an inclined surface that connects the contact portion and the gap forming surface in the medium transporting direction.

According to the aspect, the pushing member includes the inclined surface that connects the contact portion and the gap forming surface in the medium transporting direction. Therefore, the medium transported through the gap can be guided between the contact portion and the transparent member.

According to a seventh aspect, in the sixth aspect, the contact portion and the inclined surface are provided over an entire region of the transport path in a width direction intersecting the medium transporting direction.

According to the aspect, the contact portion and the inclined surface are provided over the entire region of the transport path in the width direction intersecting the medium transporting direction. Therefore, the medium can be guided more securely between the contact portion and the transparent member.

According to an eighth aspect, in any one aspect of the first to seventh aspects, the contact portion is provided at a downstream end portion of the pushing member in the medium transporting direction.

According to the aspect, the contact portion is provided at the downstream end portion of the pushing member in the medium transporting direction. Therefore, it is possible to ensure a longer distance from the pressing position. Accordingly, when the medium passes between the contact portion and the transparent member, the pushing member is easily inclined, and the transport resistance of the medium can be further reduced.

According to a ninth aspect, in the eighth aspect, the first path surface includes a scooping member that scoops the medium that has passed between the contact portion and the transparent member in a direction away from the transparent member.

According to the aspect, the scooping member provided on the first path surface causes the medium that has passed between the contact portion and the transparent member to be scooped in the direction away from the transparent member. Therefore, the medium can be transported toward the downstream. The medium can avoid clogging of the medium in the transport path immediately after passing between the contact portion and the transparent member, that is, when the medium is scooped at a position close to the contact portion. In the aspect, since the contact portion is provided at the downstream end portion of the pushing member in the medium transporting direction, a distance between the contact portion and the scooping member can be shortened.

According to a tenth aspect, in any one aspect of the first to the ninth aspects, the image reading further includes a reinforcing member disposed between the pushing member and the pressing member to reinforce the pushing member, the pressing member and the reinforcing member have conductivity, and the pushing member is grounded via the reinforcing member and the pressing member.

According to the aspect, the pushing member is grounded via the reinforcing member and the pressing member having conductivity. Therefore, both the reinforcement of the pushing member and the grounding can be realized by the reinforcing member, and the number of components constituting the apparatus can be reduced.

According to an eleventh aspect, in any one aspect of the first to tenth aspects, the pushing member includes a white reference plate which is used as a reference for reading by the reading section, and the white reference plate includes a sheet-like translucent member and a white colored layer provided on a first surface of the translucent member, and is adhered to the gap forming surface by an adhesive layer disposed between the white colored layer and the pushing member.

According to the aspect, the white reference plate includes the sheet-like translucent member and the white colored layer provided on the first surface of the translucent member, and is adhered to the gap forming surface by the adhesive layer disposed between the white colored layer and the pushing member. Therefore, the attachment of the white reference plate to the pushing member can be easily performed.

First Embodiment

An image reading apparatus according to an embodiment of the present disclosure will be described with reference to the drawings. As an example of the image reading apparatus, a scanner unit 10 is taken as an example.

In an XYZ coordinate system illustrated in each drawing, a Y-axis direction is a direction along a medium transporting direction in the scanner unit 10, and an X-axis direction intersecting the medium transporting direction is a width direction of a medium. In addition, a Z direction is a height direction of the apparatus. A −X direction is a front of the apparatus, and a +X direction is a rear of the apparatus. Further, a destination in the medium transporting direction is referred to as a downstream, and the opposite is referred to as an upstream.

Outline of Multifunction Machine Including Scanner Unit

Figure 1:
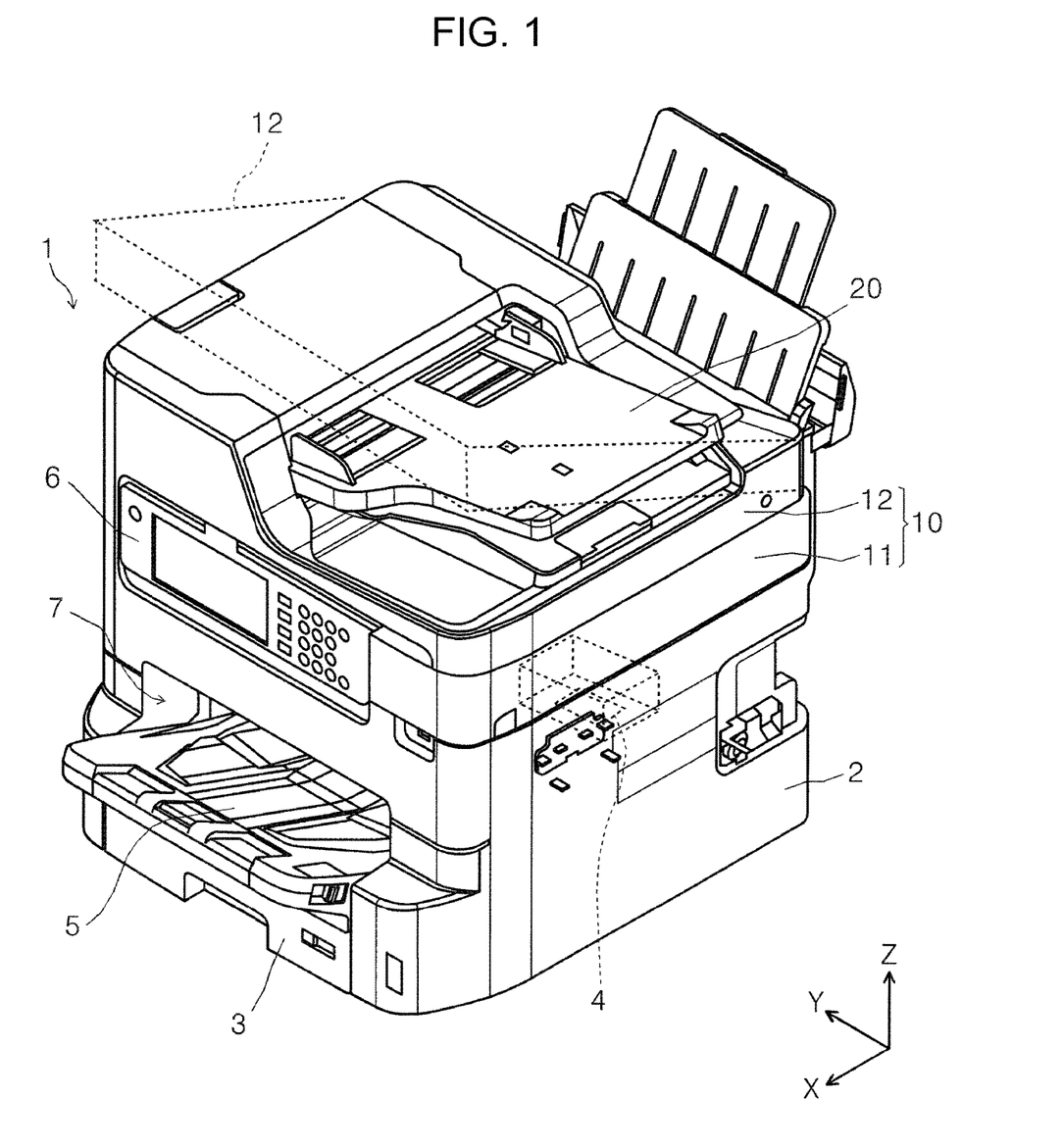
FIG. 1 is an external perspective view of a multifunction machine including a scanner unit according to an embodiment of the present disclosure.

Referring mainly to FIG. 1, a multifunction machine 1 including the scanner unit 10 as an image reading apparatus will be described.

The multifunction machine 1 illustrated in FIG. 1 includes a recording unit 2 and the scanner unit 10 provided above the recording unit 2, and includes both a recording function and an image reading function.

In addition, an operation section 6 is provided at an upper portion in front of the multifunction machine 1 illustrated in FIG. 1. The operation section 6 is provided with a display unit such as a liquid crystal panel. Further, by operating the operation section 6, it is possible to input instructions for a recording operation in the recording unit 2 and an image reading operation in the scanner unit 10 to the multifunction machine 1.

In the multifunction machine 1, the recording unit 2 includes a plurality of sheet storage cassettes 3, at a lower portion, for storing a recording sheet. A recording section 4 is provided inside the recording unit 2, and recording is performed on the recording sheet transported from the sheet storage cassette 3 by the recording section 4. The recording sheet after recording is discharged from a discharge section 7 and is placed on a recording unit discharge tray 5. In the multifunction machine 1, the discharge section 7 and the recording unit discharge tray 5 are provided between the scanner unit 10 and the sheet storage cassette 3 in the Z-axis direction, which is the height direction of the apparatus.

Scanner Unit

Hereinafter, the scanner unit 10 will be described mainly with reference to FIG. 2.

Figure 2:
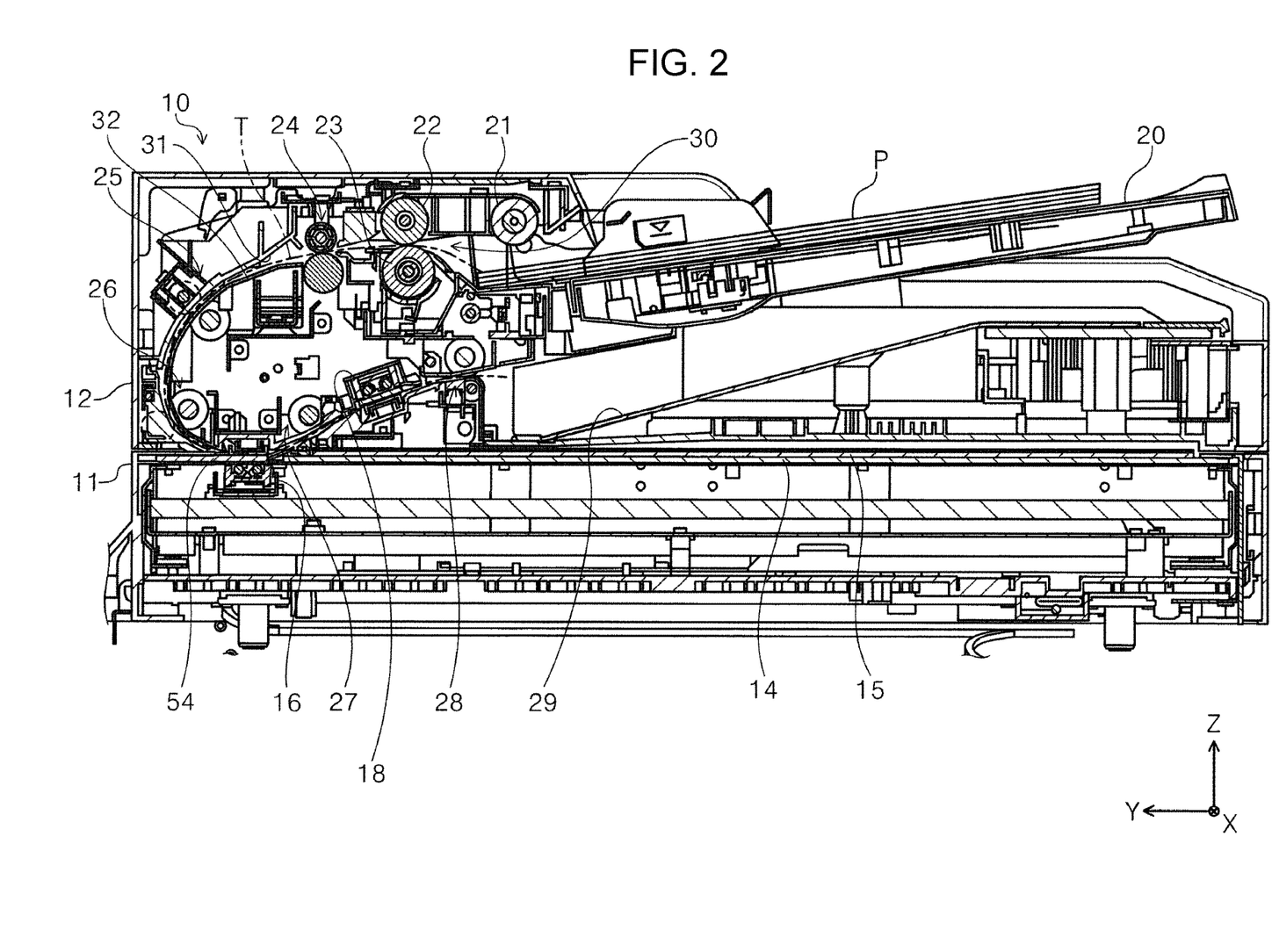
FIG. 2 is a side sectional view of the scanner unit illustrated in FIG. 1.

The scanner unit 10 includes a scanner main body 11 that reads a document set on a transparent member 14 as a document table illustrated in FIG. 2, and an automatic feeder 12 that is capable of automatically transporting and reading the document (medium P) placed on a feeding tray 20.

The automatic feeder 12 provided on the upper portion of the scanner main body 11 is configured to be capable of switching between a posture of closing the transparent member 14 of the scanner main body 11 (FIG. 2) as illustrated by a solid line in FIG. 1, and a posture of opening the transparent member 14 as illustrated by a dotted line in FIG. 1. In other words, the automatic feeder 12 is connected to the scanner main body 11 so as to be openable and closable, with the rear side (−X direction) of the scanner main body 11 as a rotation fulcrum.

The scanner main body 11 illustrated in FIG. 2 is provided with a first reading section 16. The first reading section 16 is provided below the transparent member 14 and is configured to be movable in the Y-axis direction, and can read a document placed on the transparent member 14. For the first reading section 16, for example, an optical reading section such as a CIS system or a CCD system is used. The transparent member 14 is formed of colorless and transparent glass as an example.

On the lower surface of the automatic feeder 12, a pushing plate 15 that pushes the medium placed on the transparent member 14 is provided. The medium is placed on the transparent member 14 exposed by opening the automatic feeder 12, and in a state in which the automatic feeder 12 is closed and the medium is pushed by the pushing plate 15, the first reading section 16 is moved in the Y-axis direction. Thus, an image on the medium can be read.

The first reading section 16 can read not only the medium placed on the transparent member 14 but also the medium transported by the automatic feeder 12.

The one-dotted chain line illustrated as reference symbol T in FIG. 2 is indicated along a transport path 30 of the medium P in the automatic feeder 12. The transport path 30 is a path along which the medium P is transported between an outer path surface 31 as a "first path surface" and an inner path surface 32 as a "second path surface" facing the outer path surface 31.

The transport path 30 is a path until the medium P picked up by a pickup roller 21 described later is discharged to the discharge tray 29.

In the automatic feeder 12, the first reading section 16 and the second reading section 18 described later are configured to be capable of reading both sides of the medium P.

The medium P before being fed in the automatic feeder 12 is placed on the feeding tray 20 as a medium placing portion. The pickup roller 21 is provided on the +Y side of the medium P placed on the feeding tray 20, that is, above the vicinity of a leading end of the medium P in the feeding direction. A feeding roller 22 is provided on the +Y side, which is a downstream side of the pickup roller 21 in the feeding direction.

The pickup roller 21 is configured to be capable of switching between a separated state in which the pickup roller 21 is separated from the medium P on the feeding tray 20 and a contact state in which the pickup roller 21 comes into contact with the medium P on the feeding tray 20. The pickup roller 21 illustrated in FIG. 2 is in the separated state. In the contact state, the pickup roller 21 picks up the medium P placed on the feeding tray 20 and sends the medium P out to the transport path 30.

The medium P sent out by the pickup roller 21 is further transported to the downstream by the feeding roller 22. A separation roller 23 is disposed in the −Z direction that is below the feeding roller 22. When there are two or more media P picked up by the pickup roller 21, the separation roller 23 nips the media P with the feeding roller 22 and separates the media P one by one. A first transport roller pair 24 that receives and transports the medium P from the feeding roller 22 and the separation roller 23 is provided in the downstream of the feeding roller 22 and the separation roller 23.

The transport path 30 is curved in the downstream of the first transport roller pair 24. The medium P is curved and reversed while being transported along the transport path 30 by a second transport roller pair 25 and a third transport roller pair 26 provided in the downstream of the first transport roller pair 24.

The medium P is read by the first reading section 16 and the second reading section 18 in the downstream of the third transport roller pair 26. The first reading section 16 reads an upper surface of the medium P placed on the feeding tray 20, and the second reading section 18 reads a lower surface of the medium P placed on the feeding tray 20. Configurations of peripheries of the first reading section 16 and the second reading section 18 in the transport path 30 will be described in detail later.

In the transport path 30, a fourth transport roller pair 27 transporting the medium P is provided between the first reading section 16 and the second reading section 18. A discharge roller pair 28 is provided in the downstream of the second reading section 18. The medium P after being read by the first reading section 16 or the second reading section 18 is discharged to the discharge tray 29 by the discharge roller pair 28.

The discharge tray 29 is configured to receive the medium P discharged by the discharge roller pair 28 in an inclined posture.

In the present embodiment, the transport path 30 is formed as a path for curving and reversing the medium P, but the transport path 30 may be a straight path that sends the medium P toward the first reading section 16 and the second reading section 18 without curving and reversing the medium P from the feeding tray 20 to the discharge tray 29.
Peripheral Configuration of First Reading Section in Transport Path Hereinafter, a peripheral configuration of the first reading section 16 in the transport path 30 will be described with reference to the drawings.

Figure 3:
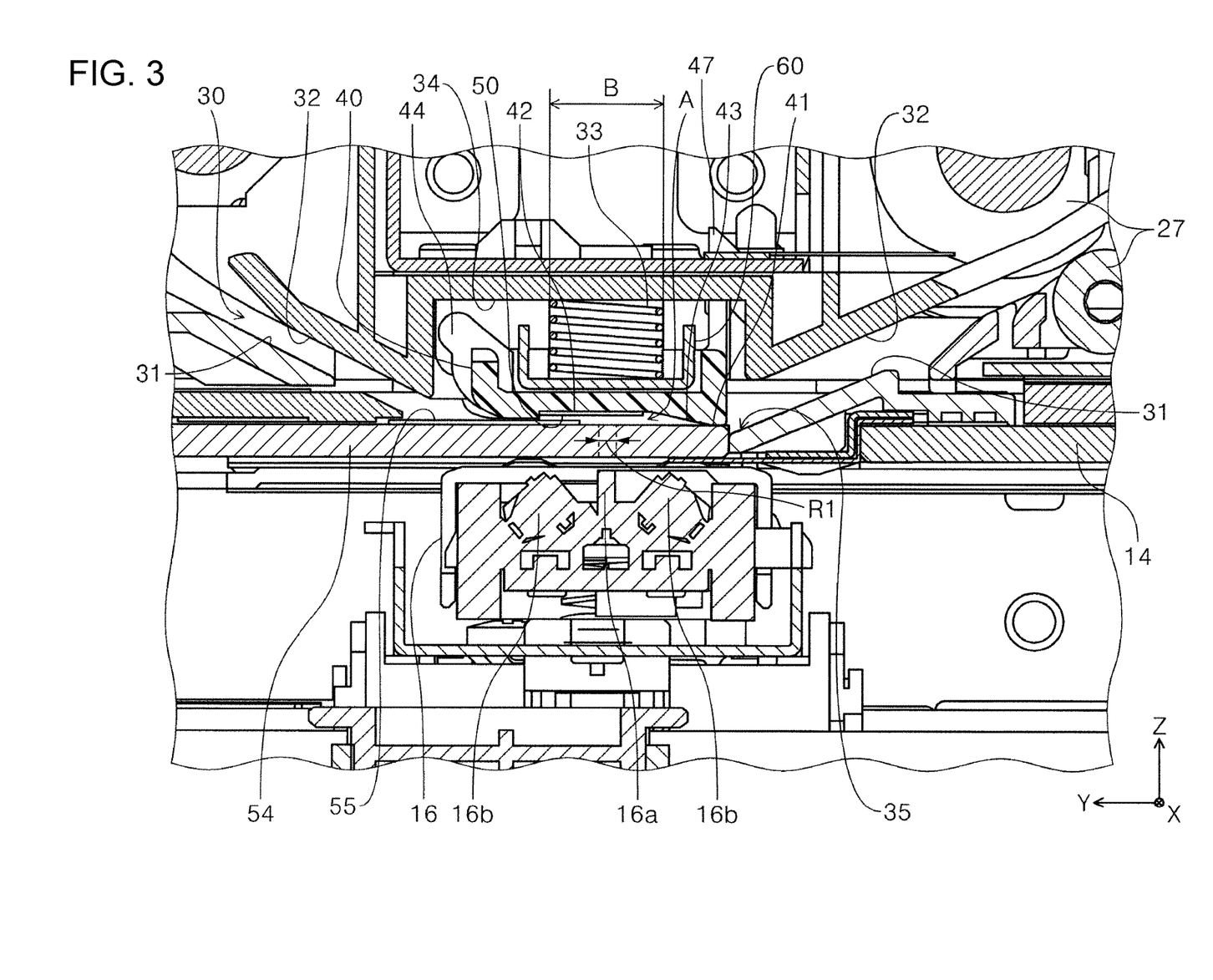
FIG. 3 is a side sectional view of a periphery of a first reading section in a transport path of an automatic feeder illustrated in FIG. 2.

As illustrated in FIG. 3, the transport path 30 along which the medium P is transported between the outer path surface 31 (first path surface) and the inner path surface 32 (second path surface) is a path, in which a part of the outer path surface 31 is formed of a transparent member 54 for automatic document feeding and reading, which is different from the transparent member 14 on which the document is placed. The first reading section 16 is provided below the transparent member 54 and reads the medium P transported along the transport path 30 via the transparent member 54.

The first reading section 16 includes a reading sensor 16a and light emitting sections 16b and 16b provided on both sides of the reading sensor 16a in the medium transporting direction. A region facing the reading sensor 16a in the medium transporting direction is a first reading region R1 in the first reading section 16, and light is emitted from the light emitting sections 16b and 16b toward the first reading region R1 of the transport path 30. The reading sensor 16a reads reflected light from the medium P that passes through the first reading region R1.

In FIG. 3, a pushing member 40 that pushes the medium P toward the transparent member 54 is provided at a position facing the first reading section 16 with the transparent member 54 interposed therebetween.

The pushing member 40 is pressed toward the transparent member 54 by a coil spring 33 as a pressing member. The coil spring 33 is disposed between the pushing member 40 and the abutting portion 34, so that one end is in contact with the reinforcing member 60 provided on the pushing member 40 and the other end is in contact with the abutting portion 34 inside the apparatus. The reinforcing member 60 will be described later.

The pushing member 40 includes a contact portion 41 that comes into contact with the transparent member 54 in the downstream of the first reading region R1 in the medium transporting direction, by the first reading section 16, and as illustrated in FIG. 3, in a state in which the medium P is not transported, the contact portion 41 of the pushing member 40 pressed downward by the coil spring 33 is in contact with the transparent member 54.

Further, the pushing member 40 illustrated in FIG. 3 includes a gap forming surface 42 that is positioned in a direction further away from the transparent member 54 than the contact portion 41, which includes the first reading region R1, in the upstream of the contact portion 41 in the medium transporting direction, and forms a gap A in which the medium P can be transported between the pushing member 40 and the transparent member 54.

That is, the pushing member 40 pressed toward the transparent member 54 by the coil spring 33 comes into contact with the transparent member 54 at the contact portion 41 provided in the downstream of the first reading region R1 in the medium transporting direction. In a region in the upstream of the contact portion 41 including the first reading region R1, the medium P is transported in the gap A formed by the gap forming surface 42. Therefore, it is possible to avoid a concern that a transport resistance from the pushing member 40 is applied to the medium P transported to the first reading region R1.

A pressing position B of the pushing member 40 by the coil spring 33 is shifted from the position of the contact portion 41 in the medium transporting direction. With this configuration, for example, the transport resistance between the contact portion 41 and the transparent member 54 can be made smaller than that a case in which the position of the contact portion 41 is set to the pressing position B. Therefore, it is possible to reduce a concern of poor transport of the medium P passing between the pushing member 40 and the transparent member 54.

In the present embodiment, the pressing position B overlaps the gap forming surface 42 in the medium transporting direction. That is, the coil spring 33 presses the pushing member 40 from above the gap forming surface 42. With this configuration, the gap forming surface 42 can be more reliably pressed in a direction toward the transparent member 54.

Figure 4:
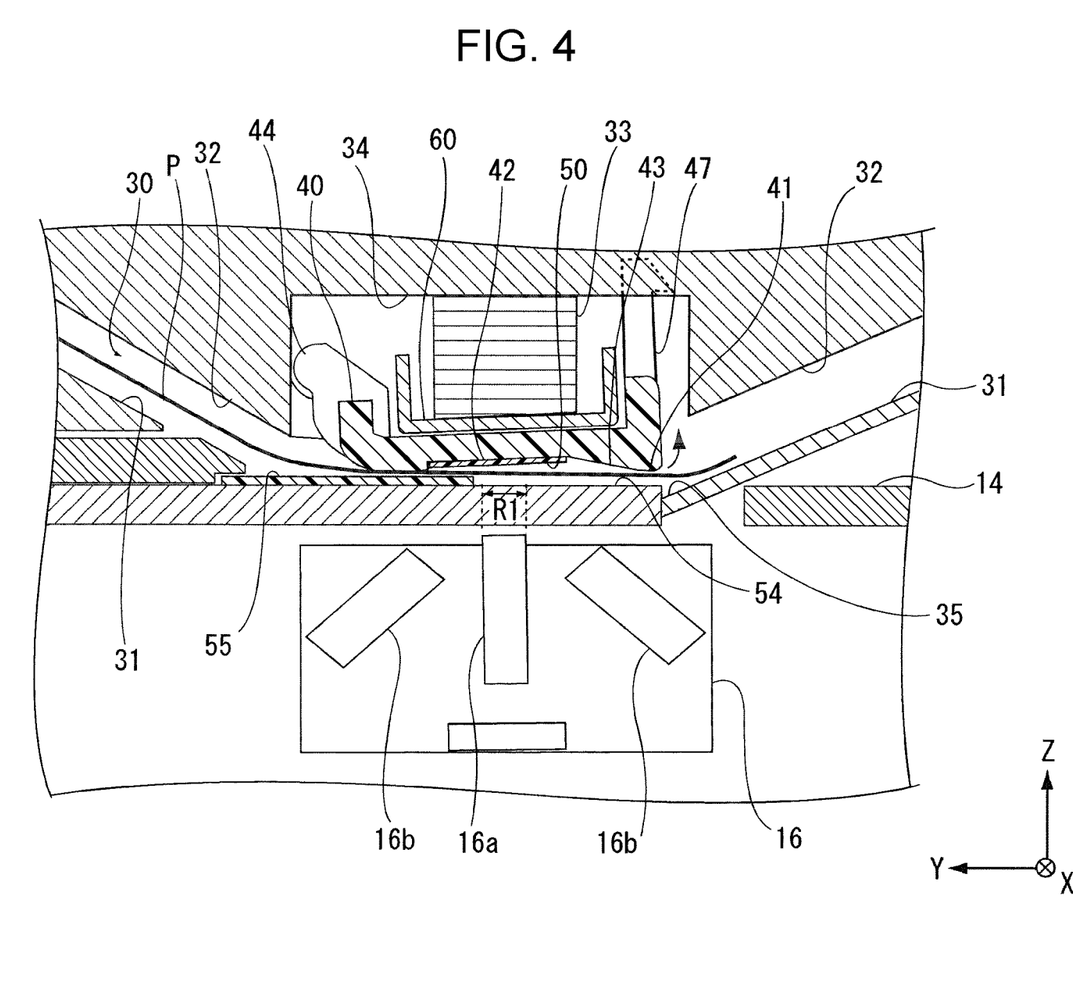
FIG. 4 is a schematic side sectional view illustrating a state in which a medium passes between a transparent member and a contact portion.

As illustrated in FIG. 4, the transported medium P pushes up the pushing member 40 against the pressing force of the coil spring 33 and passes between the pushing member 40 and the transparent member 54.

The pushing member 40 is configured so that the contact portion 41 is rotatable in a direction away from the transparent member 54 against the pressing force of the coil spring 33, with the first support portion 44 in the upstream of the pressing position B in the medium transporting direction illustrated in FIG. 3 as a rotation fulcrum. With this configuration, as illustrated in FIG. 4, when the medium P is transported between the contact portion 41 and the transparent member 54, the pushing member 40 can rotate, so that the contact portion 41 escapes in a direction away from the transparent member 54. Accordingly, the transport resistance of the medium P can be reduced.

Figure 5:
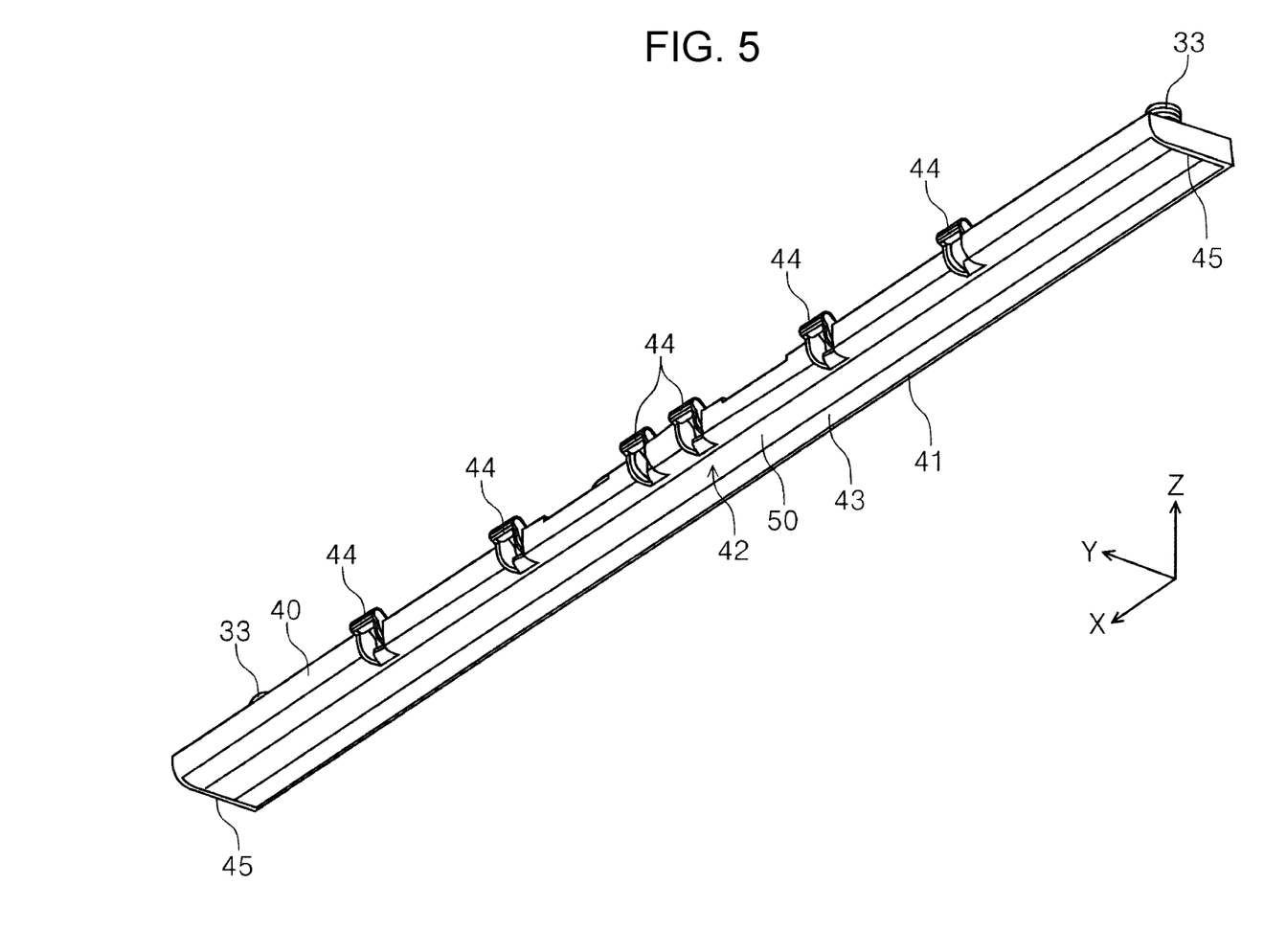
FIG. 5 is a perspective view illustrating a pushing member and a pressing member.
Figure 6:
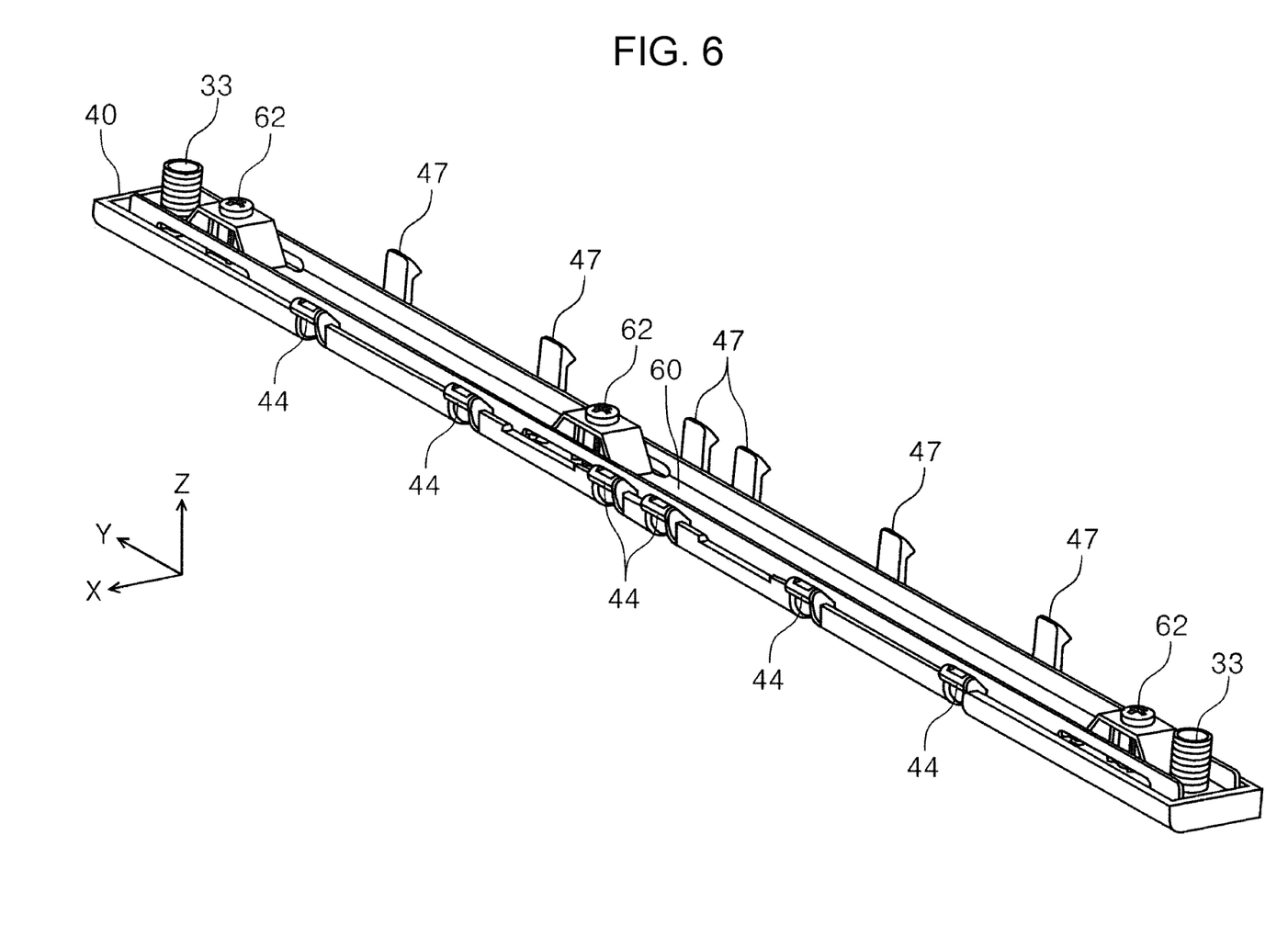
FIG. 6 is a perspective view of the pushing member and the pressing member when viewed from an angle different from that in FIG. 4.

In the present embodiment, as illustrated in FIGS. 5 and 6, a plurality of first support portions 44 are disposed with intervals in the X-axis direction with respect to the pushing member 40. In FIG. 6, second support portions 47 are provided in the downstream of the pushing member 40. The position of the pushing member 40 in the medium transporting direction is defined by bringing the first support portions 44 and the second support portions 47 abut against predetermined portions in the apparatus.

Moreover, as illustrated in FIG. 3, the contact portion 41 is provided at a downstream end portion of the pushing member 40 in the medium transporting direction. Since the contact portion 41 is provided at the downstream end portion of the pushing member 40, a longer distance from the pressing position B can be secured. Accordingly, when the medium P passes between the contact portion 41 and the transparent member 54, the pushing member 40 is easy to be inclined as illustrated in FIG. 4, and it becomes easy for the medium P to push away the contact portion 41. Therefore, the transport resistance of the medium P can be further reduced.

As illustrated in FIGS. 3 and 4, the pushing member 40 includes an inclined surface 43 that connects the contact portion 41 and the gap forming surface 42 in the medium transporting direction. With the inclined surface 43, the medium P can be smoothly guided between the contact portion 41 and the transparent member 54 from the gap A formed by the gap forming surface 42.

An inclination angle of the inclined surface 43 can be formed approximately 10 degrees with respect to a bottom of the gap forming surface 42, and is set to 12 degrees in the present embodiment.

Further, as illustrated in FIG. 5, in the pushing member 40, the contact portion 41 is provided over an entire region of the transport path 30 in the X-axis direction that is the width direction intersecting the medium transporting direction. The inclined surface 43 that continues from the gap forming surface 42 to the contact portion 41 is also provided over the entire region in the width direction.

The contact portion 41 is provided over the width direction so that, for example, rippling (also referred to as cockling or corrugation) in the width direction of the medium P is suppressed, and good image reading by the first reading section 16 is can be performed. Further, the contact portion 41 and the inclined surface 43 are provided over the entire region in the width direction, so that the medium P can be more reliably guided between the contact portion 41 and the transparent member 54.

Figure 9:
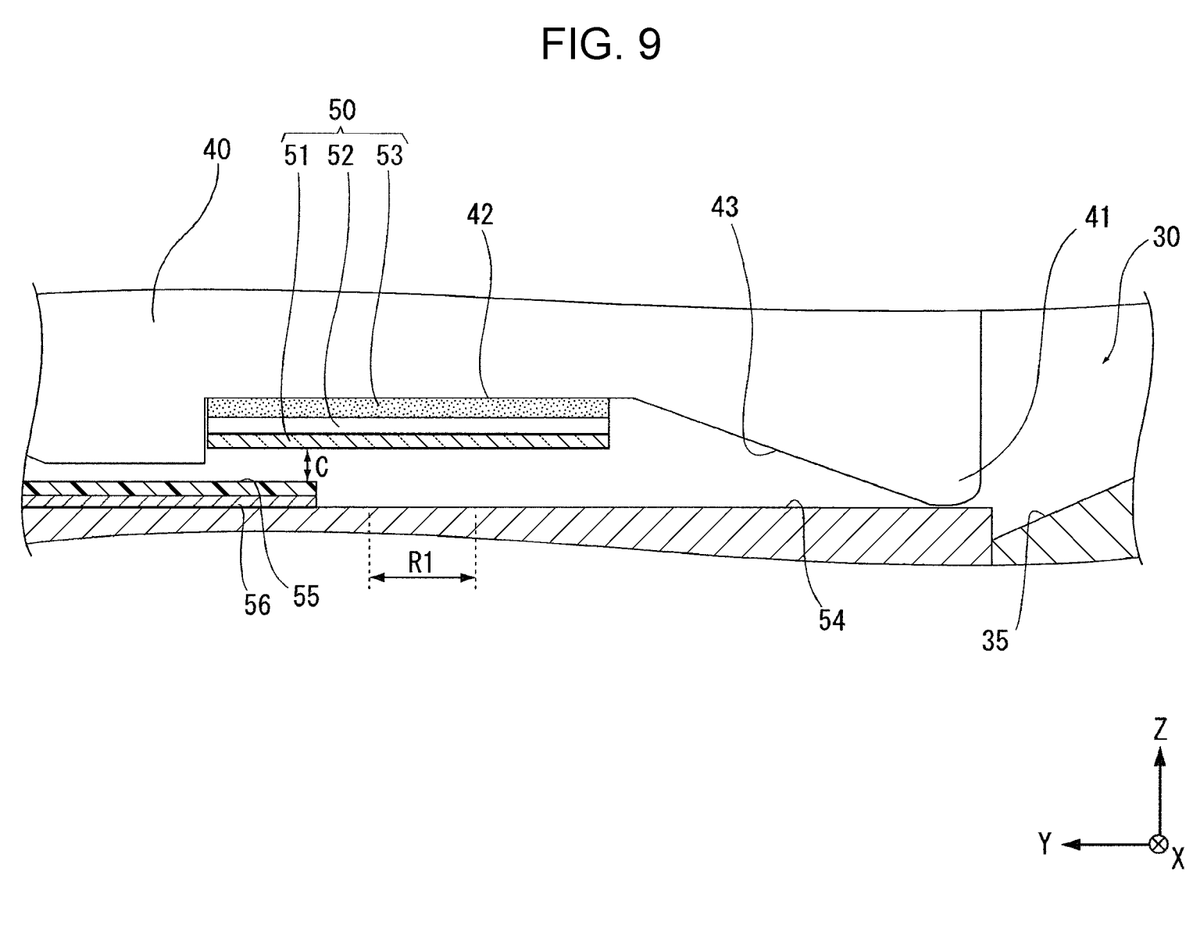
FIG. 9 is an enlarged side sectional view illustrating a main portion of a periphery of a first reading section.

As illustrated in FIG. 3, the pushing member 40 includes a white reference plate 50 that is used as a reference for reading by the first reading section 16. In the present embodiment, the white reference plate 50 is provided on the gap forming surface 42. More specifically, as illustrated in FIG. 9, the white reference plate 50 includes a sheet-like translucent member 51 and a white colored layer 52 provided on a first surface (upper surface in FIG. 3) of the translucent member 51, and is adhered to the gap forming surface 42 by an adhesive layer 53 disposed between the white colored layer 52 and the pushing member 40. In this way, the white reference plate 50 can be easily attached to the pushing member 40.

The white reference plate 50 can also be formed of a white resin material. In addition to attaching the white reference plate 50 to the gap forming surface 42 with the adhesive layer 53, for example, a white reference plate attaching portion having a mechanical configuration may be provided.

Figure 8:
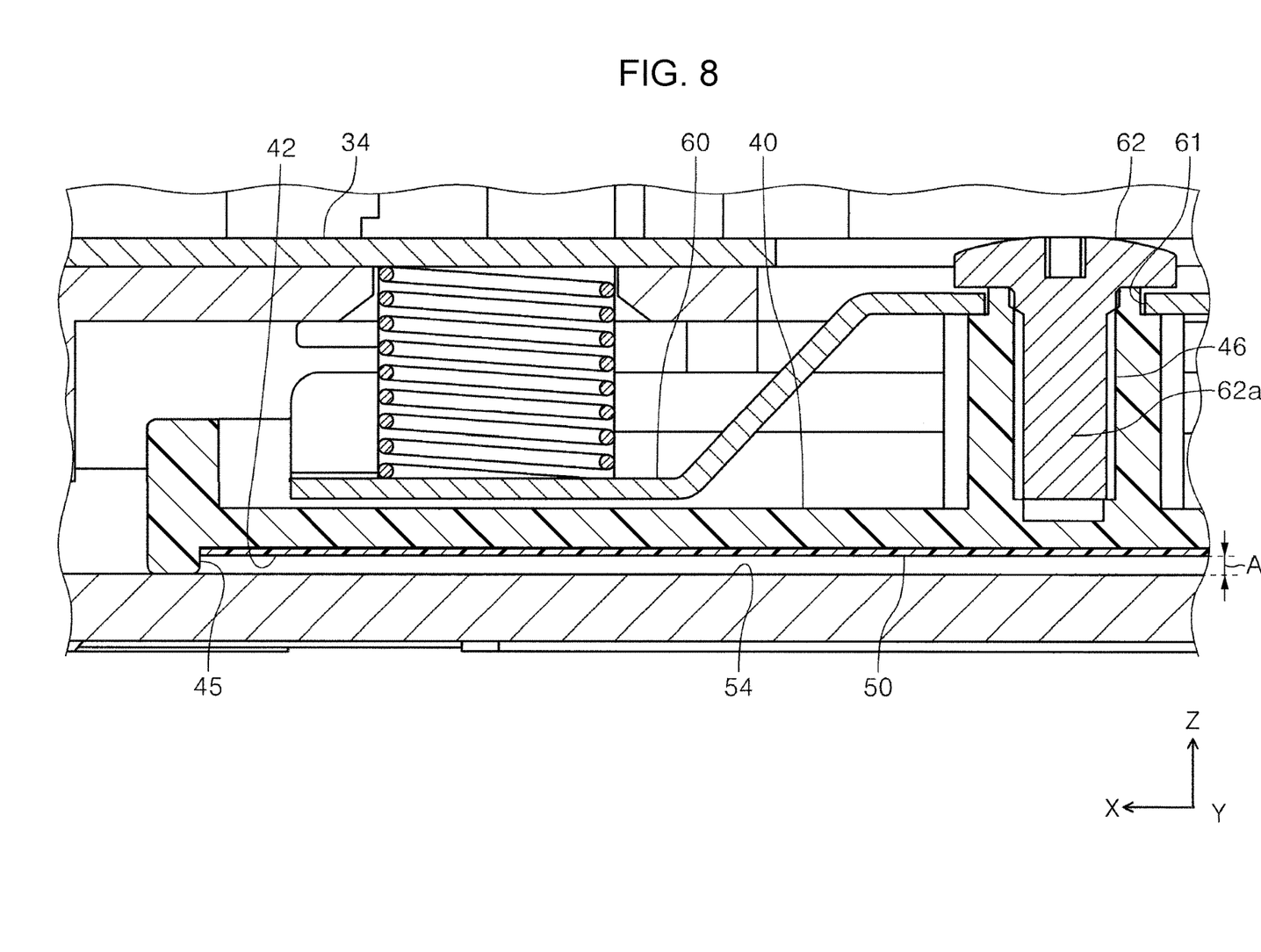
FIG. 8 is a longitudinal sectional view of the pushing member and the pressing member attached to an automatic feeder.

As illustrated in FIGS. 5 and 8, the pushing member 40 includes foot portions 45 and 45 that are provided on both sides of the gap forming surface 42 in the width direction intersecting the medium transporting direction, and abut against the transparent member 54 outside the medium transport region in the width direction (X-axis direction). In FIG. 8, only the foot portion 45 in the +X side is illustrated.

The foot portions 45 and 45 abut against the transparent member 54 that forms a part of the outer path surface 31, so that the gap A, in which the medium P is capable of being transported, can be reliably formed between the gap forming surface 42 and the transparent member 54. In addition, abutting destinations of the foot portions 45 and 45 may be members that form the outer path surface 31, and is not limited to the transparent member 54. Further, for example, the foot portions 45 and 45 may be provided on the outer path surface 31 side, and the foot portions 45 and 45 may abut against the gap forming surface 42 to form the gap A.

Further, as illustrated in FIG. 5, in the present embodiment, the contact portion 41 and the inclined surface 43 extending in the width direction are connected to the foot portions 45 and 45 on the +X side and the −X side at both end portions in the width direction.

The pushing member 40 is formed of a resin material as an example, and the contact portion 41, the inclined surface 43, and the foot portions 45 and 45 are integrally formed so as to surround the gap forming surface 42.

Figure 7:
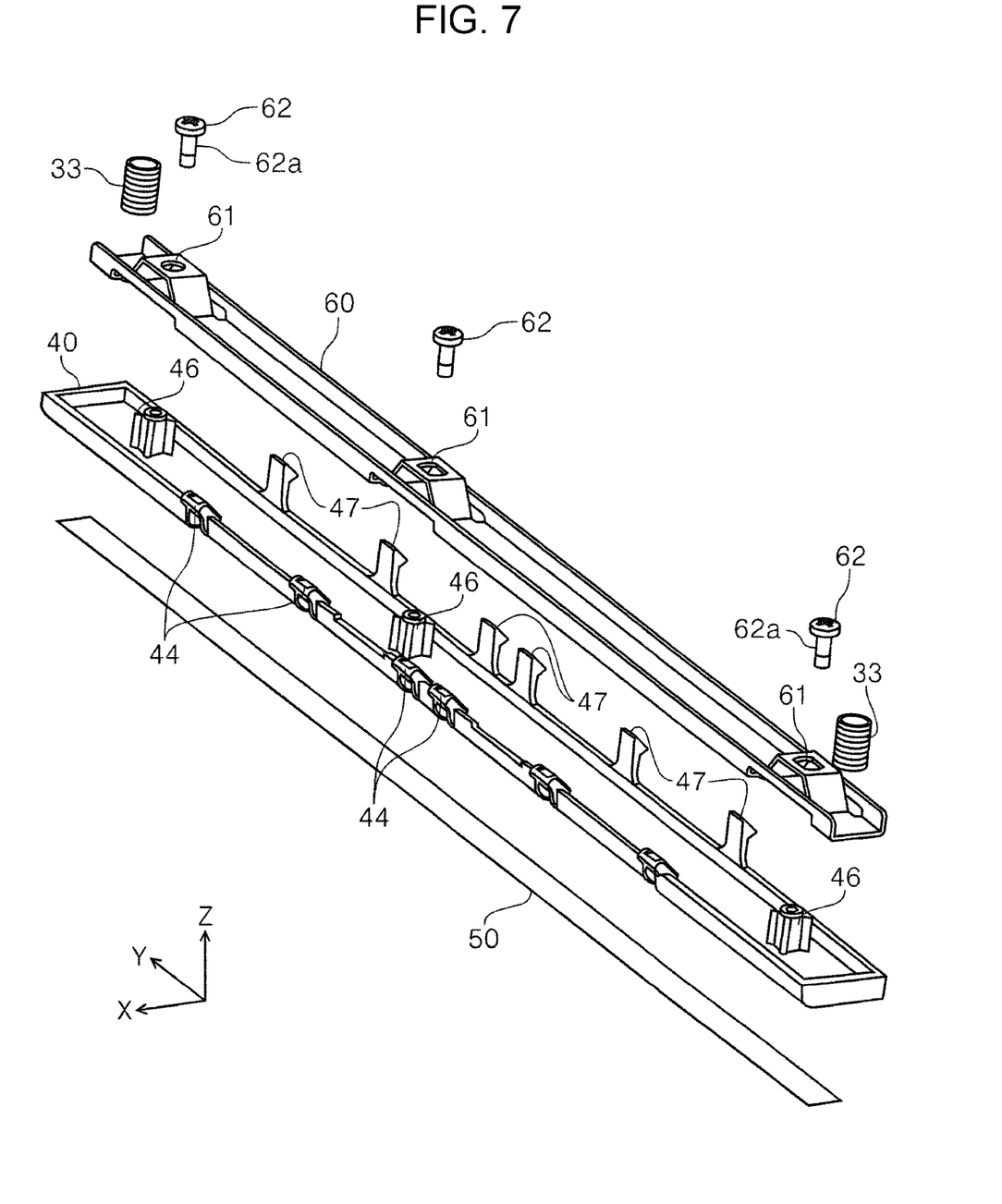
FIG. 7 is an exploded perspective view of the pushing member and the pressing member illustrated in FIG. 5.

As illustrated in FIGS. 6 and 7, the pushing member 40 is provided with the reinforcing member 60 that is disposed between the coil springs 33 and reinforces the pushing member 40. As described above, the pushing member 40 is formed of a resin material and is elongated in the width direction. Therefore, the pushing member 40 is likely to bend or distort in the width direction, but this can be suppressed by providing the reinforcing member 60.

As illustrated in FIG. 6, the reinforcing member 60 is fixed to the pushing member 40 by a plurality of screws 62. In FIGS. 7 and 8, reference numeral 61 denotes a hole into which the screw 62 is inserted. The pushing member 40 is provided with a screw insertion portion 46 into which a cylindrical portion 62a of the screw 62 is inserted.

The coil spring 33 and the reinforcing member 60 are formed of, for example, a conductive metal material, and respectively have conductivity. The pushing member 40 is grounded via the reinforcing member 60 and the coil spring 33.

When the medium P is transported along the transport path 30 illustrated in FIG. 3, the pushing member 40 may be charged. If the pushing member 40 is charged, the transport of the medium P is affected, and there is a concern that proper transport cannot be performed. Therefore, it is desirable that the pushing member 40 is grounded.

In the present embodiment, since both the reinforcement of the pushing member 40 and the grounding are performed by the reinforcing member 60, it is not necessary to provide a grounding component portion in addition to the reinforcing member 60. Therefore, the number of components constituting the apparatus can be reduced.

Next, a scooping member 35 disposed in the downstream of the contact portion 41 will be described with reference to FIGS. 3 and 4. The outer path surface 31 (first path surface) includes the scooping member 35 that scoops the medium P passed between the contact portion 41 and the transparent member 54 in a direction away from the transparent member 54.

The scooping member 35 is disposed in the downstream of the contact position of the contact portion 41 with respect to the transparent member 54 in the medium transporting direction. As illustrated in FIG. 4, the scooping member 35 is formed on an inclined surface that rises toward the downstream in the medium transporting direction with respect to the transparent member 54, and has a shape with which the medium P is scooped from below.

Since the medium P read by the first reading section 16 is pushed by the pushing member 40 toward the transparent member 54 from the inner path surface 32 side, the medium P after passing between the contact portion 41 and the transparent member 54 may curl from the inner path surface 32 side toward the outer path surface 31 side.

By providing the scooping member 35, the medium P pushed from the inner path surface 32 side can be scooped from the outer path surface 31 side and appropriately transported.

An inclination angle of the scooping member 35 can be formed approximately 20 degrees with respect to the transparent member 54, and is set to 23 degrees as an example in the present embodiment.

Next, a sheet material 55 provided in the upstream of the first reading region R1 will be described.

In FIGS. 3 and 4, the sheet material 55 is provided on the transparent member 54 in the upstream of the first reading region R1.

A resin sheet can be used as the sheet material 55. In the present embodiment, a black resin sheet formed of polyoxymethylene (POM) is used as an example. The sheet material 55 is adhered to the transparent member 54 with a double-sided tape 56 illustrated in FIG. 9. In the present embodiment, a thickness of the sheet material 55 is 0.2 mm, and is configured to be approximately 0.3 to 0.4 mm higher than the transparent member 54, together with a thickness of the double-sided tape 56.

By providing the sheet material 55 in the upstream of the first reading region R1, the medium P transported as illustrated in FIG. 4 can be transported without direct contact with a portion of the transparent member 54 corresponding to the first reading region R1. Therefore, it is possible to reduce a concern that the portion of the transparent member 54 corresponding to the first reading region R1 is stained.

The above-described foot portion 45 is formed to a length that makes a distance C (FIG. 9) through which the medium P can pass between the sheet material 55 and the gap forming surface 42. In the present embodiment, as illustrated in FIG. 9, since the white reference plate 50 is provided on the gap forming surface 42, the distance C between the white reference plate 50 and the sheet material 55 is set to a distance through which the medium P can pass.

Peripheral Configuration of Second Reading Section in Transport Path

Figure 10:
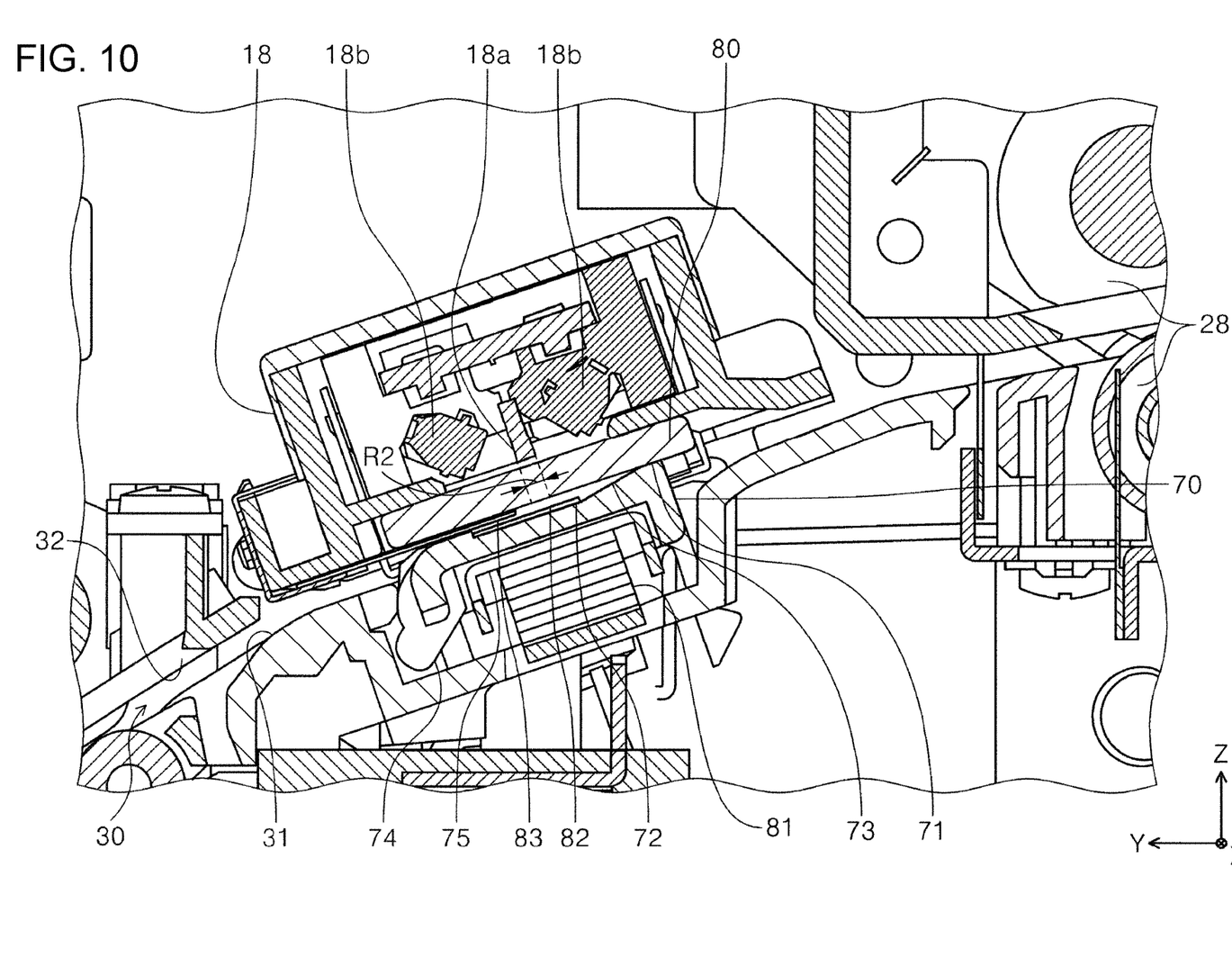
FIG. 10 is a side sectional view of a periphery of a second reading section in the transport path of the automatic feeder illustrated in FIG. 2.

As illustrated in FIG. 10, a peripheral configuration of the second reading section 18 in the transport path 30 is a configuration in which the first reading section 16 is turned upside down. Since the peripheral configuration is basically the same as the peripheral configuration of the first reading section 16, detailed description thereof will be omitted.

In the description of the peripheral configuration of the first reading section 16 described above, the first path surface is the outer path surface 31 and the second path surface is the inner path surface 32. However, if the peripheral configuration of the second reading section 18 is described, since the peripheral configuration of the first reading section 16 is turned upside down, the first path surface is the inner path surface 32 and the second path surface is the outer path surface 31.

Hereinafter, the peripheral configuration of the second reading section 18 corresponding to the peripheral configuration of the first reading section 16 will be described. The second reading section 18 corresponding to the first reading section 16 includes a reading sensor 18a and light emitting sections 18b and 18b. A part of the inner path surface 32 is formed by the transparent member 80, and the second reading section 18 reads the medium P transported along the transport path 30 via the transparent member 80. A region that overlaps the reading sensor 18a in the medium transporting direction is a second reading region R2 by the second reading section 18.

A pushing member 70 that pushes the medium P from the outer path surface 31 side toward the transparent member 80 is provided at a position facing the second reading section 18, with the transport path 30 interposed therebetween. The pushing member 70 includes a contact portion 71, a gap forming surface 72, an inclined surface 73, and a third support portion 74 respectively corresponding to the contact portion 41, the gap forming surface 42, the inclined surface 43, and the first support portion 44 in the pushing member 40.

The pushing member 70 is reinforced by a reinforcing member 75 and is pressed by a coil spring 81 as a pressing member toward the transparent member 80 via the reinforcing member 75.

A white reference plate 82 is provided on the gap forming surface 72. A sheet material 83 is provided on the transparent member 80 in the upstream of the second reading region R2.

The scanner unit 10 can be configured to provide a reversing path along which the medium P after being read by the first reading section 16 is reversed, and is again sent to the first reading region R1 by the first reading section 16 without the second reading section 18 in the transport path 30 of the automatic feeder 12.

In addition, it is needless to say that the present disclosure is not limited to the embodiments described above, and various modifications are possible within the scope of the present disclosure described in the claims, and these are also included in the scope of the present disclosure.

What is claimed is:

1. An image reading apparatus comprising:
    a transport path that forms a path for transporting a medium between a first path surface and a second path surface facing the first path surface;
    a transparent member forming a part of the first path surface;
    a reading section that reads the medium transported along the transport path via the transparent member;
    a pushing member that pushes the medium transported along the transport path from a second path surface side toward the transparent member; and
    a pressing member that presses the pushing member from the second path surface side toward the transparent member, wherein
    the pushing member includes
        a contact portion that comes into contact with the transparent member in a downstream of a reading region by the reading section in a medium transporting direction, and
        a gap forming surface that is positioned in a direction further away from the transparent member than the contact portion in an upstream of the contact portion which includes the reading region in the medium transporting direction, and is formed with a gap in which the medium is configured to be transported between the pushing member and the transparent member, and a pressing position of the pushing member by the pressing member is shifted from a position of the contact portion in the medium transporting direction.

2. The image reading apparatus according to claim 1, wherein the pressing position overlaps the gap forming surface in the medium transporting direction.

3. The image reading apparatus according to claim 2, wherein the pushing member is configured so that the contact portion is rotatable in a direction away from the transparent member against a pressing force of the pressing member, with the upstream of the pressing position in the medium transporting direction as a rotation fulcrum.

4. The image reading apparatus according to claim 1, wherein the pushing member includes foot portions that are provided on both sides of the gap forming surface in a width direction intersecting the medium transporting direction, and abut against the first path surface in an outside of a medium transport region in the width direction.

5. The image reading apparatus according to claim 4, further comprising:

a sheet material in the transparent member in the upstream of the reading region.

6. The image reading apparatus according to claim 1, wherein the pushing member includes an inclined surface that connects the contact portion and the gap forming surface in the medium transporting direction.

7. The image reading apparatus according to claim 6, wherein the contact portion and the inclined surface are provided over an entire region of the transport path in a width direction intersecting the medium transporting direction.

8. The image reading apparatus according to claim 1, wherein the contact portion is provided at a downstream end portion of the pushing member in the medium transporting direction.

9. The image reading apparatus according to claim 8, wherein the first path surface includes a scooping member that scoops the medium that has passed between the contact portion and the transparent member in a direction away from the transparent member.

10. The image reading apparatus according to claim 1, further comprising:

a reinforcing member disposed between the pushing member and the pressing member to reinforce the pushing member, wherein the pressing member and the reinforcing member have conductivity, and the pushing member is grounded via the reinforcing member and the pressing member.

11. The image reading apparatus according to claim 1, wherein the pushing member includes a white reference plate which is used as a reference for reading by the reading section, and the white reference plate includes a sheet-like translucent member and a white colored layer provided on a first surface of the translucent member, and is adhered to the gap forming surface by an adhesive layer disposed between the white colored layer and the pushing member.

* * * * *